Patented Oct. 20, 1931

1,828,372

UNITED STATES PATENT OFFICE

HERMANN JOCHHEIM, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF ACETALDEHYDE AND ACETIC ACID

No Drawing. Application filed November 10, 1927, Serial No. 232,475, and in Germany December 13, 1926.

It is already known that acetylene can be converted into acetaldehyde by means of water or water vapor with the aid of solutions or suspensions of suitable catalysts among which mercuric oxid or mercuric sulphate, especially in the presence of sulfuric acid, are particularly suitable.

I have now found that in place of water or water vapor the elements of the same namely hydrogen and either oxygen or a gas containing or supplying oxygen can be brought into reaction with acetylene by passing the latter over catalysts having both oxidizing and hydrating properties at suitable temperatures in admixture with hydrogen and with oxidizing gases or other substances furnishing oxygen. Depending on the conditions of working, either acetaldehyde or acetic acid is obtained as the chief or sole reaction product.

When acetaldehyde is to be produced, particularly good results are obtained when employing compounds of mercury or vanadium, or mixtures of these substances as catalysts. For the said purpose of working temperature ranging between about 40° and 180° C. is most suitable. The quantity of oxygen will generally be chosen so as to be not in excess over the amount theoretically required. However, also higher amounts of oxygen may be employed, which manner of working is of particular advantage when the acetalydehyde is directly to be further oxidized to acetic acid.

On the other hand, when acetic is to be produced directly, salts of tin, copper, silver or mercury, especially such as contain vanadium in the acid radicle, either alone or in admixture with each other or with other substances, for example metallic oxids or acid anhydrides are preferably employed as catalysts and the operation is carried out at temperatures of 60 to 300° C. but preferably at 100 to 250° C. and with a larger addition of oxygen than for the production of acetaldehyde. The process may also be carried out in such a manner that the hydration of the acetylene and the oxidation to acetic acid do not take place simultaneously, but one after the other without the acetaldehyde being isolated.

In the process under consideration, and especially when treating gaseous mixtures high in acetylene, a risk of explosion is liable to arise if the oxidizing gases be admitted all at once. According to the present invention this drawback can be overcome and the process rendered applicable without danger also to gaseous mixtures with a high acetylene content by introducing the oxidizing gases, and, if necessary, also the hydrogen or gases containing the same by stages, for example at three or more successive places, whether in the same or in separate reaction vessels containing catalysts.

The process according to this invention offers particular advantages in the case of treating acetylene mixtures which already contain hydrogen ab initio and possibly other gases as well. Hydrogen and gases containing the same may, however, be also added to acetylene or gases containing acetylene. The chief advantage of the present process is that it is entirely carried out in the gaseous phase and can be effected continuously and that any regeneration of mercury salts which is necessary when working with aqueous or acid solutions, is dispensed with; further, when producing acetic acid, highly concentrated acid can directly be produced even from gases low in acetylene.

If acetylene containing methane is taken as the initial material, residual gases which are free from or have only a low content in acetylene but are comparatively rich in methane are obtained. These residual gases may be advantageously converted into acetylene in any convenient way, for example with the aid of the electric arc, or by catalytic heat treatment, as for example according to the process described in application for patent Serial No. 162,074, filed January 19, 1927. In this manner it is possible, for example to transform natural gases or other methane-bearing gases, for example, such as result from industrial processes such as the destructive hydrogenation of carbonaceous materials by treatment with hydrogen with or without the aid of pressure, or the synthesis of ammonia, completely into valuable products such as acetylene which is again converted into acetaldehyde and acetic acid.

The following examples further illustrate the nature of the invention which however is not restricted thereto. The parts are by volume, unless otherwise stated.

*Example 1*

A gaseous mixture consisting of about 10 parts of hydrogen, 5 parts of nitrogen, 2 parts of acetylene and 1 part of oxygen, is passed at about 120° C. over a catalyst consisting of 50 parts, by weight, of mercuric chloride and 50 parts, by weight, of vanadic anhydride. About 80 per cent of the acetylene are converted into acetaldehyde.

*Example 2*

100 parts of a gaseous mixture consisting of 15 parts of hydrogen and 1 part of acetylene are mixed with 10 parts of oxygen, and the resulting mixture is passed at about 250° C. over 5 parts of active carbon, onto which silver vanadate is precipitated. About 50 per cent of acetic acid of about 30 per cent strength is obtained directly by cooling the reaction gases.

*Example 3*

100 parts of a gas mixture containing 6 parts of acetylene and about 70 parts of hydrogen are mixed with about 10 parts of oxygen. The resulting mixture is passed at 120° C. over a catalyst consisting of 80 per cent, by weight, of basic mercuric sulfate and 20 per cent, by weight, of silver vanadate and then at about 200° C. over asbestos impregnated with tin vanadate. Acetic acid of 60 per cent strength is obtained in a yield of about 70 per cent.

*Example 4*

A mixture of 23.6 parts of acetylene and 76.4 parts of hydrogen is passed through a series of seven reaction vessels, some of which are charged with silver vanadate, and the others with tin vanadate. At the same time about 10 parts of oxygen are admitted into the first reaction vessel and about 7 parts into each of the following reaction vessels. On cooling the reaction mixture issuing from each of the reaction vessels, acetic acid of different strength is furnished, for example that from the first reaction vessel being of 37 per cent, that from the second of 26 per cent and that from the last reaction vessel of 6 per cent strength.

*Example 5*

A gaseous mixture containing about 7 parts of acetylene, 83 parts of hydrogen and 10 parts of methane, on being treated at 250° C. with tin vanadate as the catalyst and with oxygen admitted at several successive places, furnishes acetic acid. The gas left at the end of the treatment containing only 0.6 per cent of acetylene consists substantially of a mixture of hydrogen and methane (with a content of about 26 per cent of methane) which is transformed into acetylene in the electric arc.

What I claim is:—

1. The process of producing acetaldehyde and acetic acid, which comprises passing a gas containing acetylene together with gases containing the elements of water, namely hydrogen and a gas furnishing oxygen over a dry catalyst having both oxidizing and hydrating properties at temperatures of 40 to 300° C.

2. The modification of the process according to claim 1, which comprises introducing the gas furnishing oxygen in stages only such amounts of oxygen being introduced in each stage that no danger of explosion occurs.

3. The process of producing acetaldehyde and acetic acid, which comprises passing a gas containing acetylene, methane and gases containing the elements of water, namely hydrogen and a gas furnishing oxygen, over a catalyst having both oxidizing and hydrating properties at temperatures of 40° to 300° C.

4. The process of producing acetaldehyde and acetic acid which comprises passing a gas containing acetylene together with gases containing the elements of water, namely, hydrogen and a gas furnishing oxygen, over a dry catalyst comprising a mixture of vanadates selected from the class consisting of vanadates of tin, copper, silver and mercury.

5. The process of producing acetaldehyde and acetic acid, which comprises passing a gas containing acetylene together with gases containing the elements of water, namely hydrogen and a gas furnishing oxygen over a dry catalyst comprising substances selected from the group consisting of the compounds of mercury, tin, silver and vanadium having oxidizing and hydrating properties.

6. The process of producing acetaldehyde and acetic acid, which comprises passing a gas containing acetylene together with gases containing the elements of water, namely hydrogen and a gas furnishing oxygen, over a dry catalyst comprising mercuric chloride at temperatures of from 40° to 300° C.

7. The process of producing acetaldehyde and acetic acid, which comprises passing a gas containing acetylene together with gases containing the elements of water, namely hydrogen and a gas furnishing oxygen, over a dry catalyst comprising mercuric chloride and vanadic anhydride at temperatures of from 40° to 300° C.

8. The process of producing acetaldehyde and acetic acid, which comprises passing a gas containing acetylene together with gases containing the elements of water, namely hydrogen and a gas furnishing oxygen, over a dry catalyst comprising tin vanadate at temperatures of from 40° to 300° C.

9. The process of producing acetaldehyde and acetic acid, which comprises passing a gas containing acetylene together with gases containing the elements of water, namely hydrogen and a gas furnishing oxygen, at a temperature between 40° and 300° C. over a dry catalyst comprising substances selected from the group consisting of the compounds of mercury, tin, silver and vanadium having oxidizing and hydrating properties.

10. The process of producing acetaldehyde and acetic acid, which comprises passing a gaseous mixture containing acetylene, hydrogen and oxygen over a dry catalyst having oxidizing and hydrating properties.

11. The process of producing acetaldehyde, which comprises passing a gaseous mixture containing acetylene, hydrogen and oxygen at a temperature of between 40° and 300° C. over a dry catalyst containing a vanadate selected from the class consisting of the vanadates of tin, copper, silver and mercury.

In testimony whereof I have hereunto set my hand.

HERMANN JOCHHEIM.